US005968573A

United States Patent [19]

Kaufman

[11] Patent Number: 5,968,573

[45] **Date of Patent: *Oct. 19, 1999**

[54] METHOD FOR ENHANCING THE FLAVOR OF FRUITS AND VEGETABLES

[76] Inventor: Galen D. Kaufman, 1605 24th St., Galveston, Tex. 77550

[ * ] Notice: This patent issued on a continued prosecution application filed under 37 CFR 1.53(d), and is subject to the twenty year patent term provisions of 35 U.S.C. 154(a)(2).

[21] Appl. No.: 08/786,887

[22] Filed: Jan. 23, 1997

Related U.S. Application Data

[60] Provisional application No. 60/010,440, Jan. 23, 1996.

[51] Int. Cl.[6] .............................. A23B 7/148; A23L 1/212

[52] U.S. Cl. .......................... 426/410; 426/419; 426/312; 426/316; 426/302; 426/308; 426/615; 426/616

[58] Field of Search .................................... 426/419, 418, 426/312, 316, 320, 327, 616, 474, 477, 615, 281, 410, 302, 308

[56] References Cited

U.S. PATENT DOCUMENTS

| | | | |
|---|---|---|---|
| Re. 14,489 | 6/1918 | Franks | 426/419 |
| 226,094 | 3/1880 | Mefford | 426/419 |
| 609,590 | 8/1898 | Santa Cruz | 426/418 |
| 2,001,628 | 5/1935 | Nierinck | 426/419 |
| 2,483,064 | 9/1949 | Reich | 426/418 |
| 3,627,393 | 12/1971 | Hickson et al. | 426/419 |
| 3,764,348 | 10/1973 | Huxsoll et al. | 426/419 |
| 3,773,527 | 11/1973 | Ruggerone | 426/419 |
| 4,055,931 | 11/1977 | Myers | 426/419 |
| 4,627,336 | 12/1986 | Nam | 426/419 |
| 4,843,956 | 7/1989 | Lashlee | 426/418 |
| 4,947,650 | 8/1990 | Blanton et al. | 426/418 |
| 5,156,009 | 10/1992 | Woodruff | 426/419 |
| 5,277,922 | 1/1994 | Rejimbal et al. | 429/419 |

FOREIGN PATENT DOCUMENTS

| | | | |
|---|---|---|---|
| 510697 | 8/1919 | France | 426/312 |
| 2334749 | 1/1975 | Germany | 426/419 |
| 561388 | 4/1957 | Italy | 426/419 |
| 60-126032 | 7/1985 | Japan | 426/419 |
| 6-169691 | 6/1994 | Japan | 426/312 |
| 87211 | 6/1936 | Sweden | 426/419 |

OTHER PUBLICATIONS

Refrigerating Engineering, pp. 453–Plus, vol. 57, May 1949.
Modern Packaging, p. 183Plus, Oct. 1969.

*Primary Examiner*—Steven Weinstein
*Attorney, Agent, or Firm*—Brown, Pinnisi & Michaels, P.C.

[57] ABSTRACT

This invention describes the transient incorporation of $CO_2$ gas into fruits and vegetables so as to enhance their flavor. The fruits and vegetables are exposed to a strongly $CO_2$ environment for a specified amount of time and within a specific temperature range. After this exposure the foodstuffs so exposed will have incorporated some of the $CO_2$ to which they were exposed to and develop a more effervescent and/or tangy flavor through the uptake of the $CO_2$ to form carbonic acid. This enhancement in flavor is a direct consequence of $CO_2$ exposure.

5 Claims, No Drawings

METHOD FOR ENHANCING THE FLAVOR OF FRUITS AND VEGETABLES

CROSS REFERENCE TO RELATED APPLICATIONS

This is a formal application based upon the provisional application Ser. No. 60/010,440 filed on Jan. 23, 1996.

FIELD OF THE INVENTION

The invention pertains to the field of placing, and then storing fruit or vegetables in a carbon dioxide environment for later consumption. More particularly, the invention pertains to enhancing the flavor of fruits and vegetables through such exposure to carbon dioxide gas.

BACKGROUND OF THE INVENTION

Typical American snack foods such as carbonated colas and processed potato chips offer the consuming public choices that while flavorful are deficient in nutritional value, contribute to unhealthful caloric intake, and can exaggerate existing physiological problems in individuals consuming these snack items. Snack items which seek to fulfill the almost mutually exclusive roles of a healthy and nutritious food item that the public desires as a common snack item are rare.

Carbonated drinks or juices are snack items that the consuming public often seeks out for the enhanced taste of the various syrups or concentrated fruit juices that form the bulk of this snacks composition. Again these snack items are often no more than concentrated syrups that are devoid of nutritional value. As such they provide only large amounts of empty calories.

The invention herein disclosed attempts to answer these problems by enhancing the natural taste of fresh fruits and vegetables so as to make them more appealing as snack items to consumers. By doing so, a new snack item is created that carries with it significant nutritional value, and generally avoids caloric intake on the same level as the most popular carbonated drinks.

SUMMARY OF THE INVENTION

The invention was discovered while eating pears and apples that had been stored in a container with dry ice overnight. The fruit was found to possess a tangy, effervescent flavor that enhanced the natural taste. This enhancement offers the availability of long-known nutritious snacks (i.e. pears, grapes, strawberries, etc.,) with a new taste.

Subsequent experimentation with $CO_2$ exposure, and a variety of other fruits and vegetables revealed that this effect can be reproduced in a period of 2–12 hours, by storing fresh fruit in a cooler or other container with 5–10 pounds of dry ice. If the produce is separated from the "dry ice" typically by a non-heat conductive barrier, it will not freeze but instead will acquire a "carbonated taste" through the prolonged exposure to carbonic acid. This carbonic acid is the result of sublimation of the frozen $CO_2$, within the closed and/or sealed container. Many types of fruits and vegetables, including also grapes (like a natural champagne), plums, strawberries, etc., acquire the carbonated effect with this exposure. The effect remains in the produce for some time after removing it from the $CO_2$ container, and is non-toxic.

DESCRIPTION OF THE PREFERRED EMBODIMENT

The invention herein disclosed describes and claims the carbonation of fruits and vegetables for use as snack items.

These foodstuffs can themselves be either fresh or previously canned, though the time required for exposure to fresh fruit with its skin intact will differ from the time required to expose previously canned fruit or vegetables. In addition, the duration of $CO_2$ exposure will also vary amongst different types of fruits and vegetables.

This invention offers a new way to enhance the flavor and appeal of many fruits and/or vegetables. With $CO_2$ treatment, the fruits and vegetables mentioned will gain a "carbonated taste" which enhances both the flavor and the experience of consuming the food item so carbonated. The typical method of production is to put frozen $CO_2$ "dry ice" and the food item to be carbonated into a closed environment for a several hour period which varies both according to the specific type of fruit so treated and whether that fruit is fresh or been preserved in some other way. It is also possible to treat the fruit in a water environment that has itself been strongly carbonated. The food item should be separated from the dry ice by a non-heat conductive barrier. Once enclosed in this sealed container the $CO_2$ will begin to sublimate, creating a cold and heavily $CO_2$ atmosphere. The food item placed in the closed $CO_2$ -rich environment will, over time, take up enough of the $CO_2$ gas within its tissues that it will provide the fruit or vegetable so consumed to have a effervescent character. This consumption, however, must be within several minutes of removal from the $CO_2$ environment, or the carbonation effect will be minimized or lost.

The objectives of the present invention include:

An object of the invention is to produce a product whose ingredient are cheap, readily available, and have a low overhead and high potential mark-up.

An object of the invention is to create a snack with significant marketing opportunities would extend from sporting events, to roadside kiosks, to parks, to grocers.

And another object of the invention is to produce a product that will appeal to modern consumers, giving them a nutritious, non-toxic, flavorful snack option.

The process will at least require the exposure of the foodstuffs to refrigeration in which carbonic acid is a large component of the refrigerated atmosphere. This can be accomplished through the use of frozen $CO_2$ "dry ice" stored with the fruits or vegetables to be made "fizzy" in a sealed container with cool temperatures.

To prevent damage by freezing to the fruits or vegetables placed in the frozen $CO_2$ environment, the fruits or vegetables are preferably shielded from any frozen $CO_2$ or frozen water by a barrier. In addition, when the fruits or vegetables are removed from the $CO_2$ environment, they are covered with a material capable of inhibiting the loss of $CO_2$ from the treated fruit or vegetable. Such material is preferably either easily removable or edible.

Materials and Method

Over time a large variety of fruits and vegetables have been exposed to a $CO_2$ environment at cool temperatures. In an effort to optimize the time of exposure to $CO_2$ for a sample species of fruit, gas experiments were carried out in which a standard 20 pound $CO_2$ tank and regulator was used to pump $CO_2$ inside a closed container over an extended period and at variable temperatures. This series of experiments was performed to determine whether $CO_2$, gas alone is sufficient to induce the "fizzy fruit" effect, rather than using $CO_2$ in some other form. The test sample consisted of 10 fresh and intact pears. Pears had previously been determined to be one of those species fruit which did obtain a "fizzy" character over an extended exposure to $CO_2$ sublimation in a closed system.

Results

The test was first carried out at room temperature by bathing the fruit in $CO_2$ gas. It took approximately three hours for the pears to acquire any perceptible tangy taste. A control pear had been placed in the same $CO_2$ room temperature environment while in a sealed plastic bag. The control pear had only slight carbonation 10 hours later.

When the test was carried out at 4° Celsius —on wet ice, the control pear, in the sealed plastic bag had attained the moderate carbonation in the above mentioned 10 hour time period. From these efforts it is apparent that it appears that the temperature of the surrounding environment plays a significant role in the speed of the take up of carbon dioxide in the fruits or vegetables exposed. If a shorter time period is desired the temperature of the surrounding environment should be lowered. Experiments with increased $CO_2$ gas pressure may also effect the speed of $CO_2$ uptake, as well as the texture or integrity of the foodstuffs so exposed.

In an effort to determine how long the "fizzy fruit" taste lasts after the removal of the exposed pears from $CO_2$ exposure, and placement in a room temperature and normal air environment, a number of pears were so tested. Pears that had been $CO_2$ exposed were removed from this environment at a variety of time points. A strong "fizness" or carbonated effect was found to remain for at least 30 minutes after exposure to normal air and temperature. By three hours, the test pears had lost the carbonated effect, and their taste was indistinguishable from that of normal pears. These results, therefore, indicate that continued incubation with $CO_2$ in a cool environment is necessary to maintain the carbonated effect.

The foregoing description has been directed to particular embodiments of the invention in accordance with the requirements of the Patent Statutes for the purposes of illustration and explanation. It will be apparent, however, to those skilled in this art that many modifications and changes will be possible without departure from the scope and spirit of the invention. It is intended that the following claims be interpreted to embrace all such modifications and changes.

I claim:

1. A method of enhancing the flavor of fruits or vegetables for consumption by a consumer, comprising the steps of:

a) placing said fruits or vegetables in a sealable enclosure;

b) exposing said fruits or vegetables to a $CO_2$ gas environment when placed within said sealable enclosure;

c) sealing said sealable enclosure such that the said $CO_2$ gas environment within said sealed enclosure can be maintained for an extended period;

d) maintaining said exposure to $CO_2$ gas in said sealable enclosure for an extended period such that the flesh of said fruits or vegetables will take up enough of the $CO_2$ gas within its tissues so that said fruits or vegetables acquires an effervescent character; and e) after the step of maintaining, removing said fruits or vegetables from said $CO_2$ gas environment and a substantially concurrently covering them with a material capable of restraining the loss of $CO_2$ from said fruits or vegetables such that said effervescent character is prolonged.

2. The method of claim 1 wherein the duration of said extended period exposure is 2–12 hours.

3. The method of claim 1 wherein said sealable enclosure is pressurized by $CO_2$ gas at a psi of 15 to 20.

4. The method of claim 1 wherein the source of said $CO_2$ gas environment is frozen $CO_2$ gas which is allowed to sublimate within said sealable enclosure.

5. The method of claim 1 wherein the fruits or vegetables placed in said sealed $CO_2$ environment are prevented from freezing by being separated by a barrier from any material having a temperature of zero degrees Centigrade or lower.

* * * * *